United States Patent
Yang et al.

(10) Patent No.: US 9,001,032 B2
(45) Date of Patent: Apr. 7, 2015

(54) TACTILE TRANSMISSION SYSTEM USING GLOVE TYPE ACTUATOR DEVICE AND METHOD THEREOF

(75) Inventors: Gi-Hun Yang, Gongju-si (KR); Sung Chul Kang, Seoul (KR); Yeonsub Jin, Gunpo-si (KR)

(73) Assignee: Korea Institute of Science and Technology, Seoul (KR)

( * ) Notice: Subject to any disclaimer, the term of this patent is extended or adjusted under 35 U.S.C. 154(b) by 109 days.

(21) Appl. No.: 13/638,348

(22) PCT Filed: Mar. 30, 2010

(86) PCT No.: PCT/KR2010/001938
§ 371 (c)(1),
(2), (4) Date: Dec. 28, 2012

(87) PCT Pub. No.: WO2011/122718
PCT Pub. Date: Oct. 6, 2011

(65) Prior Publication Data
US 2013/0093703 A1    Apr. 18, 2013

(51) Int. Cl.
G09G 5/00 (2006.01)
G06F 3/01 (2006.01)

(52) U.S. Cl.
CPC ............... *G06F 3/014* (2013.01); *G06F 3/016* (2013.01)

(58) Field of Classification Search
USPC .................................. 345/173–178, 156–169
See application file for complete search history.

(56) References Cited

U.S. PATENT DOCUMENTS

| | | | |
|---|---|---|---|
| 5,706,026 A * | 1/1998 | Kent et al. | 345/156 |
| 7,339,574 B2 | 3/2008 | Kyung et al. | |
| 7,420,539 B2 | 9/2008 | Ryu et al. | |
| 7,884,797 B1 * | 2/2011 | Ning | 345/156 |

(Continued)

FOREIGN PATENT DOCUMENTS

| | | |
|---|---|---|
| KR | 10-0536621 | 12/2005 |
| KR | 10-0538351 | 12/2005 |

OTHER PUBLICATIONS

International Search Report of PCT/KR2010/001938 mailed Dec. 17, 2010.

*Primary Examiner* — Jennifer Nguyen
(74) *Attorney, Agent, or Firm* — Goldilocks Zone IP Law (57) ABSTRACT

The present invention relates to a tactile transmission system using a glove type actuator device and a method thereof, and more particularly to a tactile transmission system using a glove type actuator device and a method thereof with which a user can cover his hand and which can directly transmit a movement according to a voltage level to a body part of the user through a piezo disk actuator attached to a position in which a stimulus is transmitted. The tactile transmission system according to one embodiment of the present invention comprises: a touch screen for driving a predetermined program; and a glove type actuator device for vibrating a part which comes in contact with the touch screen to provide curve information about a surface of an object on the program to be displayed on the touch screen. The glove type actuator device comprises: one or more actuator modules for providing vibration stimuli; a three-axis acceleration sensor for sensing positions of the actuator modules; and a controller for mapping the position information sensed by the three-axis acceleration sensor to a corresponding position on the touch screen and generating a driving signal to vibrate the actuator modules according to the curve information about the surface of the object corresponding to the mapped position.

14 Claims, 13 Drawing Sheets

(56) References Cited

U.S. PATENT DOCUMENTS

| | | | |
|---|---|---|---|
| 8,405,612 B2 * | 3/2013 | Kruse et al. | 345/163 |
| 2005/0110758 A1 | 5/2005 | Kyung et al. | |
| 2010/0090966 A1 * | 4/2010 | Gregorio | 345/173 |
| 2010/0177050 A1 * | 7/2010 | Heubel et al. | 345/173 |

\* cited by examiner

TACTILE TRANSMISSION SYSTEM USING GLOVE TYPE ACTUATOR DEVICE AND METHOD THEREOF

TECHNICAL FIELD

This disclosure relates to system and method for transmitting tactile sensation using a glove-type actuator, and more particularly, to system and method for transmitting tactile sensation using a glove-type actuator, which has a globe type worn on the hand of a user and is capable of directly transferring a motion according to the intensity of voltage to a body portion of the user by means of a piezo disk actuator attached to the location to which a stimulus is to be applied.

BACKGROUND ART

As various media devices have been developed, image information may be visually checked through a screen of TV, PC or the like. However, since the image displayed on the screen may be recognized by using only the eyes, the sense of reality about an article displayed on the screen may be deteriorated. Therefore, in order to overcome this drawback, various attempts have been made to provide tactile sensation about the image displayed on the screen.

As an example, a conventional vibrating tactile device generally vibrates the entire body of the device by using a small motor or generates vibrations by using a pin-type driving device. However, these methods are limited in their driving manners, and thus it is not easy to transfer minute roughness of the surface of the article or tactile sensation thereof.

Therefore, there is demanded a scheme capable of transferring minute information such as tactile sensation, roughness, contour or the like of an article to the body of a user as tactile sensation when the user scrubs the surface of the article on the screen provided to a user or in a virtual world, and also capable of more realistic tactile sensation according to the moving direction and speed of the vibrating tactile device.

DISCLOSURE

Technical Problem

This disclosure is directed to providing system and method for transmitting tactile sensation using a glove-type actuator, which may transfer tactile sensation about a virtual article by adjusting the intensity of vibrations and the displacement of a piezo disk actuator according to location and speed information of the actuator device on a screen or in a virtual reality world.

This disclosure is also directed to providing system and method for transmitting tactile sensation using a glove-type actuator, which may transfer tactile sensation about an article in a virtual reality world by interworking with hologram or the like by means of a three-axis acceleration sensor without contacting an actual article in the space.

Technical Solution

In one general aspect, there is provided a system for transmitting tactile sensation of the surface of a displayed article, the system including: a touch screen for operating a preset program; and a glove-type actuator for vibrating a portion coming in contact with the touch screen to provide contour information of the surface of a programmed article displayed on the touch screen, wherein the glove-type actuator includes: at least one actuator module for providing a vibration stimulus; a three-axis acceleration sensor for sensing a location of the actuator module; and a controller for mapping the location information sensed by the three-axis acceleration sensor with a corresponding location on the touch screen, and generating a driving signal to vibrate the actuator module according to the contour information of the surface of the article corresponding to the mapped location.

The actuator module may include a lower plate which comes in contact with the surface of the touch screen; and a piezo disk actuator connected to the lower plate and vibrating according to the driving signal of the controller.

The actuator module may further include a frame having a concave shape connected to the lower plate so that the piezo disk actuator is disposed therein.

A plurality of piezo disk actuators may be arranged in the frame in a lattice pattern.

A plurality of pores may be formed in a bottom surface of the lower plate.

An insulator may be attached to a conductor portion of the piezo disk actuator.

The controller may store the map about the contour information of the surface of the programmed article as a database.

In another aspect, there is provided a method for transmitting tactile sensation using a glove-type actuator, the method including: operating a preset program at a touch screen; storing a map about contour information of the surface of a programmed article displayed on the touch screen as a database; allowing an actuator module of the glove-type actuator to come in contact with the touch screen; sensing a location of the actuator module on the touch screen, and generating, by a controller of the glove-type actuator, a driving signal for vibrating the actuator module in order to provide the contour information of the surface of the article corresponding to the sensed location; and vibrating the actuator module according to the driving signal.

The location of the actuator module on the touch screen may be sensed by a three-axis acceleration sensor attached to the glove-type actuator.

The actuator module may include a piezo disk actuator and vibrate by converting an electric driving signal generated by the controller into a physical signal.

In still another aspect, there is provided a method for transmitting tactile sensation using a glove-type actuator, the method including: operating a preset program storing contour information of the surface of an article to provide a virtual object in a space; sensing, by a three-axis acceleration sensor, movement of the glove-type actuator in the space, and calculating a location by using displacement difference information in the space; mapping the calculated location with a corresponding location of the virtual object; generating, by a controller, a driving signal for vibrating the glove-type actuator in order to provide the contour information of the surface of the article corresponding to the mapped location; and vibrating the actuator module according to the driving signal.

The method for transmitting tactile sensation may further include storing the map about the contour information of the surface of the article in the controller as a database in advance.

The driving signal may be a frequency-type signal.

Advantageous Effects

The system and method for transmitting tactile sensation using a glove-type actuator according to the present disclosure may transfer information about roughness, contour or surface material of an article by directly transmitting vibrating tactile sensation to a body portion of a user.

In addition, the system and method for transmitting tactile sensation using a glove-type actuator according to the present disclosure may be easily worn by a user since it is a glove-type device, and may also transfer tactile sensation (vibrations) so that information about roughness and contour of a portion of an article displayed on the screen of a touch screen may be recognized by the body of the user.

Moreover, the system and method for transmitting tactile sensation using a glove-type actuator according to the present disclosure may interwork with hologram or the like by generating location information in a space of an actuator device, if a three-axis acceleration sensor is added, and thus provide the contour of an article as tactile sensation according to the moving direction of the actuator device in a space even though there is no direct contact portion to various articles such as dress, cloths, woods or the like sold at Internet shopping malls.

DESCRIPTION OF DRAWINGS

The above and other aspects, features and advantages of the disclosed exemplary embodiments will be more apparent from the following detailed description taken in conjunction with the accompanying drawings in which.

BEST MODE

Hereinafter, system and method for transmitting tactile sensation using a glove-type actuator according to preferred embodiments of the present disclosure will be described in detail with reference to the accompanying drawings.

Figure 1:
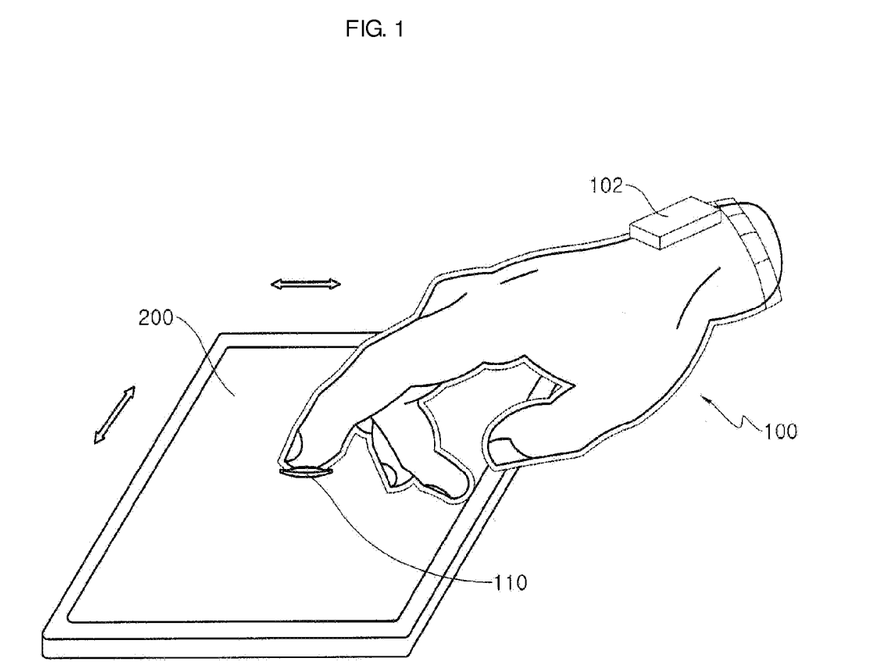
FIG. 1 is a diagram schematically showing a system for transmitting tactile sensation using a glove-type actuator according to an embodiment of the present disclosure.

FIG. 1 is a diagram schematically showing a system for transmitting tactile sensation using a glove-type actuator according to an embodiment of the present disclosure.

Referring to FIG. 1, the system for transmitting tactile sensation according to the present disclosure includes a glove-type actuator 100 and a touch screen 200.

The glove-type actuator 100 generates vibrations to transfer tactile sensation of the surface of an article in a virtual reality world. The glove-type actuator 100 comes in contact with the touch screen and generates vibrations based on location information on the touch screen 200 to transfer tactile sensation to a user.

A preset program is operated at the touch screen 200, and surface information about roughness or contour of the article displayed on the touch screen 200 may be stored in a controller (not shown) in advance. The controller may be provided at the touch screen 200 or the glove-type actuator 100.

If a user wears the glove-type actuator 100 and moves in an upper, lower, right or left direction on the touch screen 200, a specific voltage is transferred to the glove-type actuator 100 according to the mapped location. In more detail, the three-axis acceleration sensor 102 checks the location information of the actuator module 110, and the controller (not shown) maps the location information sensed by the three-axis acceleration sensor 102 with a specific location on the touch screen 200. Subsequently, the controller generates a voltage to vibrate the actuator module 110 according to the information corresponding to the specific location on the touch screen 200.

The glove-type actuator 100 may transfer realistic tactile sensation to the user by means of the intensity of vibrations and the deformation of the actuator which vary according to the intensity or change of the voltage. Therefore, the user may feel tactile sensation, for example texture, roughness or the like of cloths or article, which cannot be actually touched, through the touch screen 200. Even though FIG. 1 illustrates that a single actuator module 110 is attached to the index finger, the number of the actuator modules 110 used in the glove-type actuator 100 of the present disclosure and the attached locations at the glove-type body are not specially limited but may be modified in various ways according to environments and applications.

The three-axis acceleration sensor 102 added to the glove-type actuator 100 senses a location of the actuator module 110 by using an acceleration value according to the movement of the glove-type actuator 100.

Figure 2:
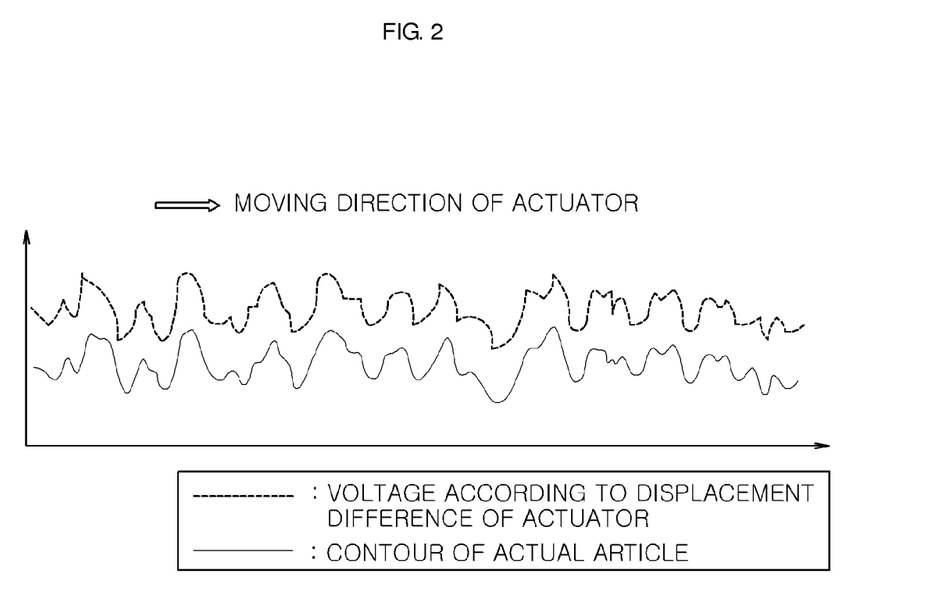
FIG. 2 is a graph comparatively showing a voltage change according to the difference in displacements and a contour of an actual article when the glove-type actuator according to the present disclosure is used.

FIG. 2 is a graph comparatively showing a voltage change according to the difference in displacements and a contour of an actual article when the glove-type actuator according to the present disclosure is used.

Referring to FIG. 2, a location of the actuator module 110 in the space is sensed by the three-axis acceleration sensor 102, and the voltage change according to the difference in displacements of the actuator module 110 is similar to a contour curve of an actual article. The sine curve graph determines the intensity of voltage of the actuator module 110, and the actuator module 110 vibrates to transfer tactile sensation of the actual article.

Figure 3:
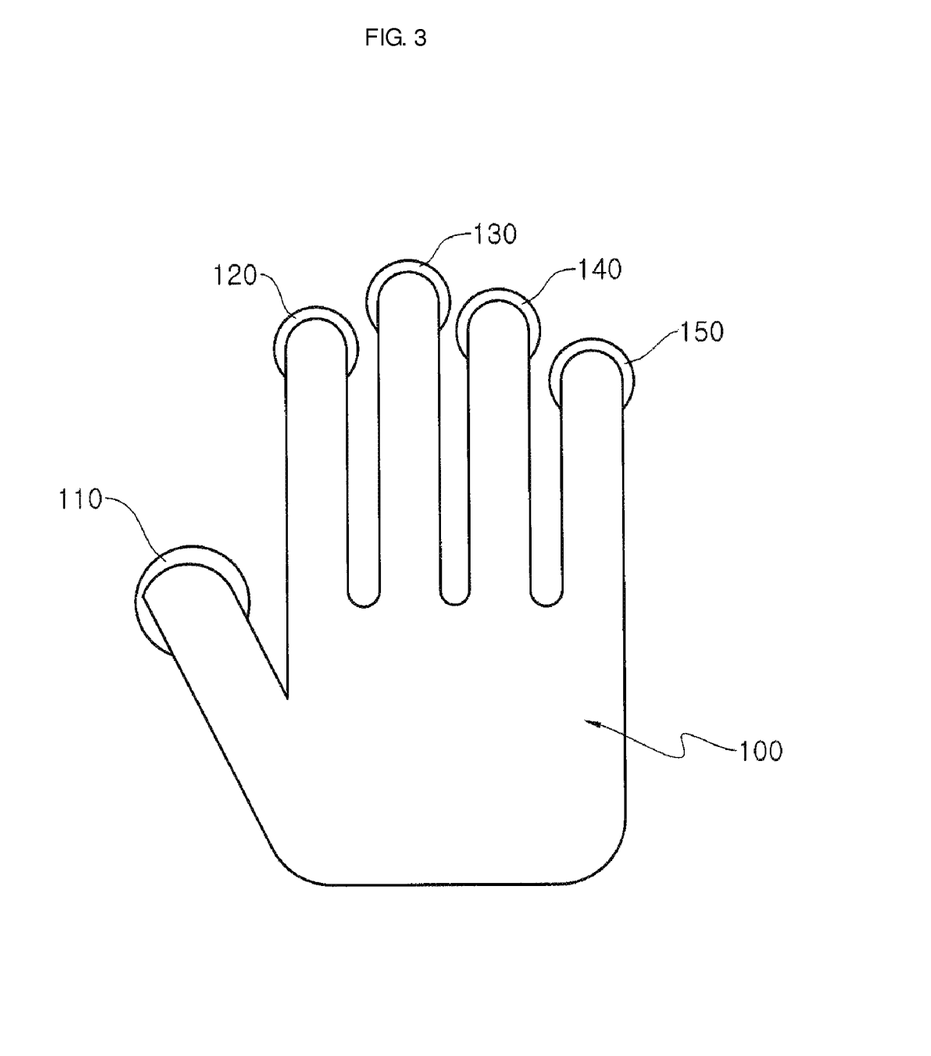
FIG. 3 is a diagram schematically showing a glove-type actuator according to an embodiment of the present disclosure.

FIG. 3 is a diagram schematically showing a glove-type actuator according to an embodiment of the present disclosure. If a plurality of actuator modules 110, 120, 130, 140, 150 are attached to the glove-type body as shown in FIG. 3, tactile sensation may be transferred to several portions of the user body simultaneously.

Figure 4:
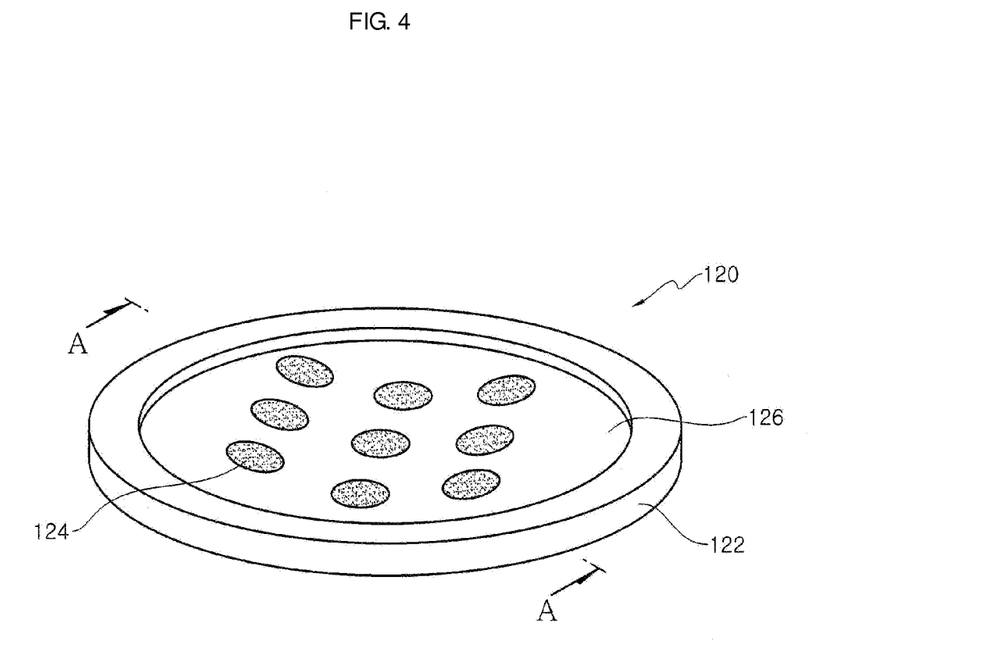
FIG. 4 is a perspective view showing the configuration of the actuator module of FIG. 3.
Figure 5:
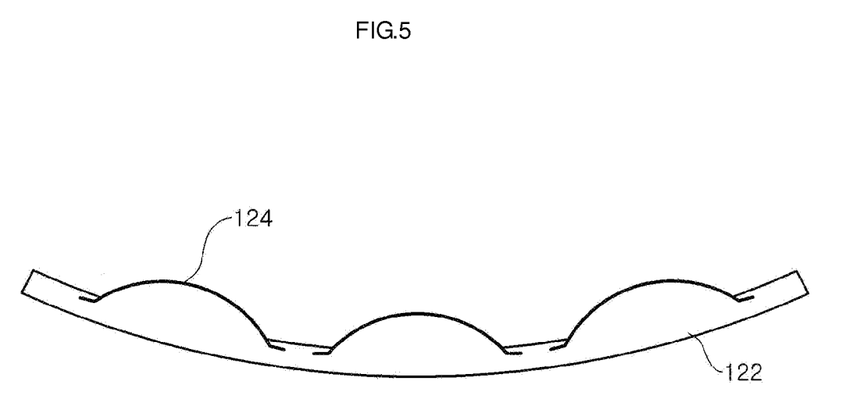
FIG. 5 is a cross-sectional view showing the actuator module of FIG. 4, taken along the line A-A.

FIG. 4 is a perspective view showing the configuration of the actuator module of FIG. 3, and FIG. 5 is a cross-sectional view showing the actuator module of FIG. 4, taken along the line A-A.

Referring to FIGS. 4 and 5, the actuator module 120 includes a lower plate 122 and a piezo disk actuator 124. The lower plate 122 fixes the piezo disk actuator 124 and may come in contact with the surface of the article. As a gap between the finger of the user and the surface of the article is smaller, the user may feel tactile sensation as if the user actually comes in contact with the surface of the article. Therefore, the lower plate 122 is preferably configured as thin as possible.

Only a single piezo disk actuator 124 may be used, and as shown in FIG. 4, a plurality of piezo disk actuators 124 may be arranged in a lattice pattern. In FIG. 4, the frame 126 is made of conductor which transfers a voltage applied to the piezo disk actuator 124 and has a concave shape with a predetermined curvature so as to be closely adhered to the finger of the user. In addition, according to another embodiment of the present disclosure, small actuators may be arranged in a special pattern in order to transfer minute contour information of the surface of an article so that two-dimensional contour information of a place, not a point, may be transferred.

Figure 6:
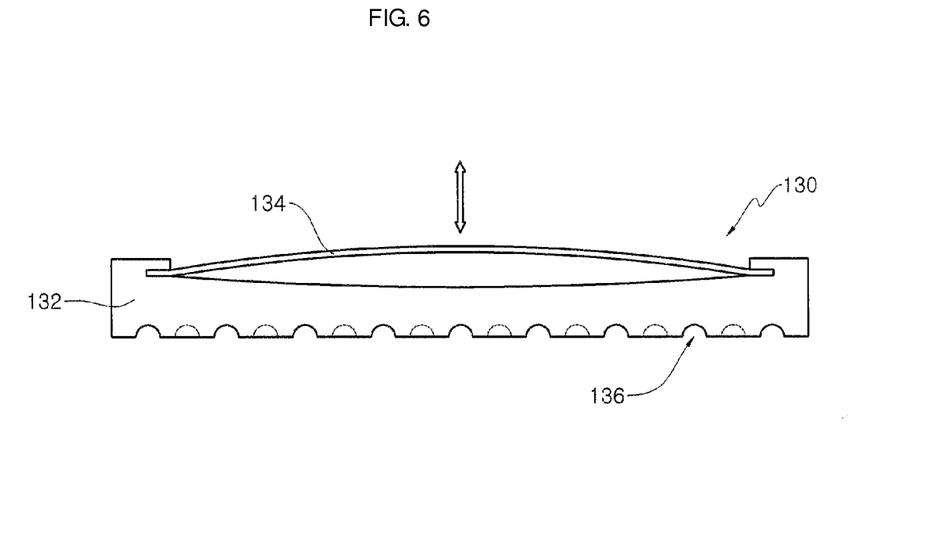
FIG. 6 is a cross-sectional view showing the configuration of an actuator module according to another embodiment of the present disclosure.
Figure 7:
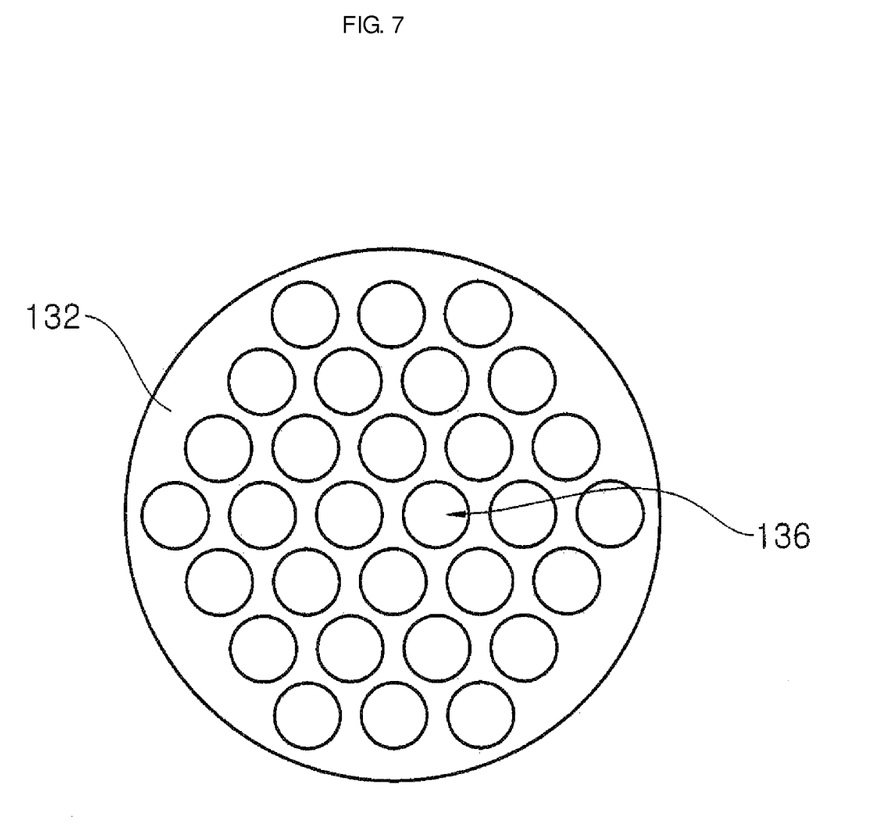
FIG. 7 is a bottom view showing the actuator module of FIG. 7.

FIG. 6 is a cross-sectional view showing the configuration of an actuator module according to another embodiment of the present disclosure, and FIG. 7 is a bottom view showing the actuator module of FIG. 6.

Referring to FIGS. 6 and 7, the actuator module 130 includes a lower plate 132 with pores 136 and a piezo disk actuator 134, and facilitates smooth movement of the actuator module 130 on a contact surface by using the squeeze film phenomenon between the lower plate 132 and the flat contact surface. The lower plate 132 coming in contact with the contact surface has a shape for surface contact, not point contact, and has the pores 136 in order to use the squeeze film phenomenon.

In more detail, if the piezo disk actuator 134 vibrates vertically in a state of touching the finger of the user, the lower plate 132 connected to the piezo disk actuator 134 also makes a motion relative to the finger. The minute movement of the lower plate 132 according to the vibrations of the piezo disk actuator 134 forms an air layer between the pores 136 of the lower plate 132 and the contact surface. If a squeeze film is formed between the lower plate 132 and the contact surface by the air layer, a surface friction between the lower plate 132 and the contact surface decreases, and the actuator module 130 and the contact surface may make smooth relative movements.

Figure 8:
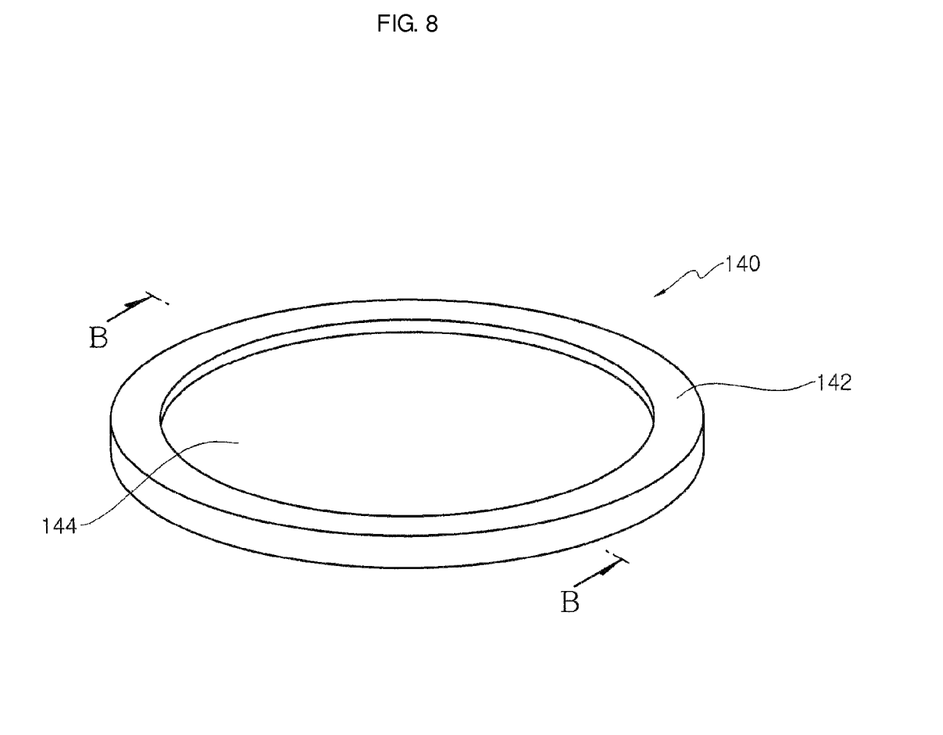
FIG. 8 is a perspective view showing the configuration of an actuator module according to another embodiment of the present disclosure.

FIG. 8 is a perspective view showing the configuration of an actuator module according to another embodiment of the present disclosure.

Referring to FIG. 8, the actuator module 140 includes a piezo disk actuator 144 and a lower plate 142 for fixing the piezo disk actuator 144. A thin insulator may be attached to a conductor portion of the piezo disk actuator 144 in order to prevent an electric shock which may occur by the contact with the skin of the user.

Figure 9:
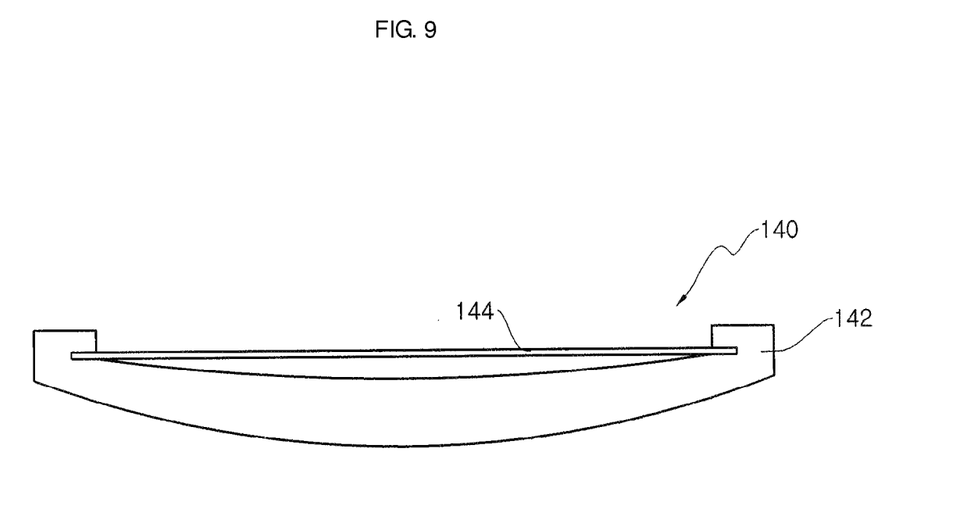
FIG. 9 is a cross-sectional view showing the actuator module of FIG. 8, taken along the line B-B, which depicts a piezo disk actuator when voltage is not applied thereto.
Figure 10:
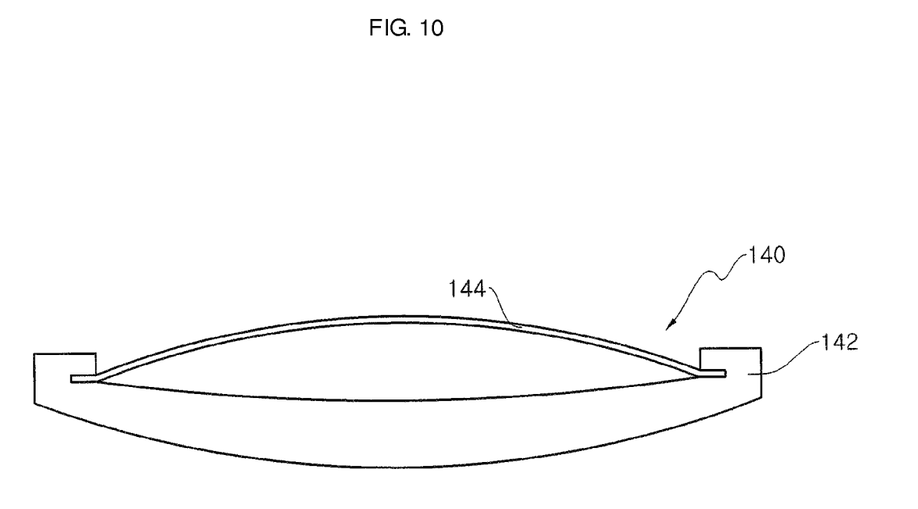
FIG. 10 is a cross-sectional view showing a piezo disk actuator with a deformed shape, when voltage is applied thereto.

FIG. 9 is a cross-sectional view showing the actuator module of FIG. 8, taken along the line B-B, which depicts the piezo disk actuator 144 when voltage is not applied thereto, and FIG. 10 is a cross-sectional view showing the piezo disk actuator 144 with a deformed shape, when voltage is applied thereto.

Figure 11:
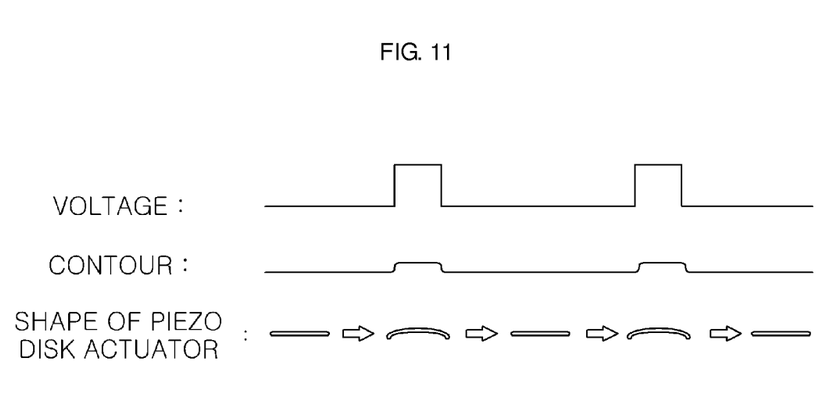
FIG. 11 is a diagram showing the voltage varying according to the contour of an article and the shape of the piezo disk actuator.

FIG. 11 is a diagram showing the voltage varying according to the contour of an article and the shape of the piezo disk actuator.

Referring to FIG. 11, if the piezo disk actuators 124, 134, 144 move in response to the voltage generated according to the contour and roughness of the surface of an article, their shapes are also deformed so that the user may feel the shape of the actual article through his skin.

Figure 12:
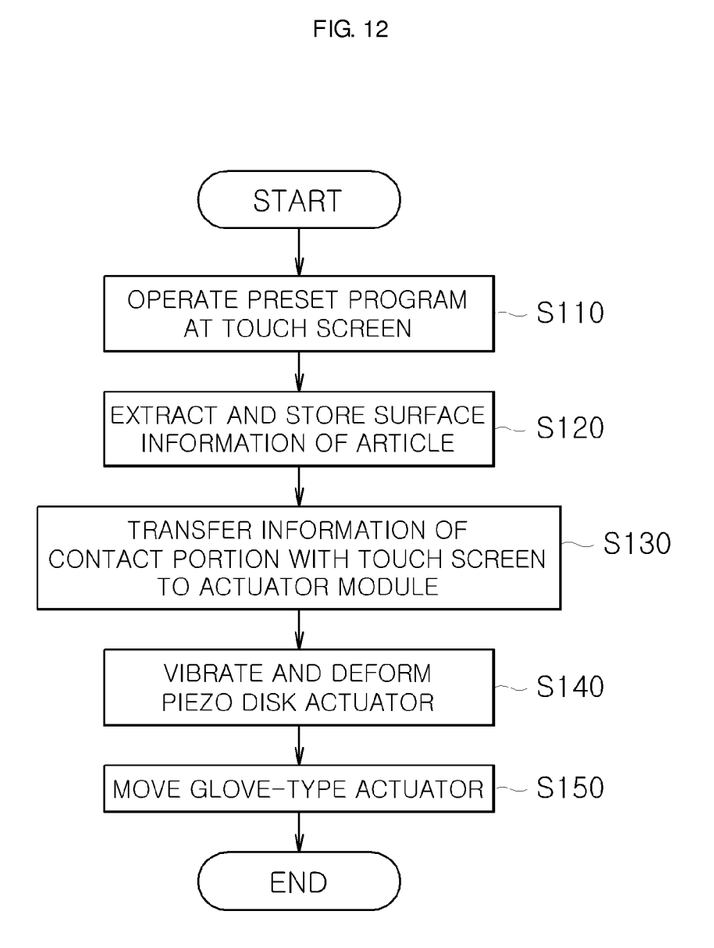
FIG. 12 is a flowchart for illustrating a method for transmitting tactile sensation using a glove-type actuator according to an embodiment of the present disclosure.

FIG. 12 is a flowchart for illustrating a method for transmitting tactile sensation using a glove-type actuator according to an embodiment of the present disclosure.

Referring to FIG. 12, a preset program is operated at the touch screen 200 (S110), and the surface information about roughness or contour of the programmed article displayed on the touch screen 200 is extracted and stored in a memory or controller interworking with the touch screen 200 (S120).

Next, if the glove-type actuator 100 approaches the touch screen 200 and the lower plates of the actuator modules 110, 120, 130, 140, 150 come in contact with the touch screen 200, a data signal about the surface information of the article at a specific location on the touch screen is transferred to the actuator modules 110, 120, 130, 140, 150 by means of the controller (S130). Here, the data signal about the surface information of the article is an electric signal generated by the controller and may be transferred to the actuator modules 110, 120, 130, 140, 150 to serve as a trigger signal for operating the piezo disk actuators 124, 134, 144.

Subsequently, the piezo disk actuators 124, 134, 144 cause vibration and deformation corresponding to the surface information of the article and transfer tactile sensation to the user (S140).

Successively, the glove-type actuator 100 moves in contact with the touch screen 200 (S150), and Operations from S130 to S150 repeat.

Figure 13:
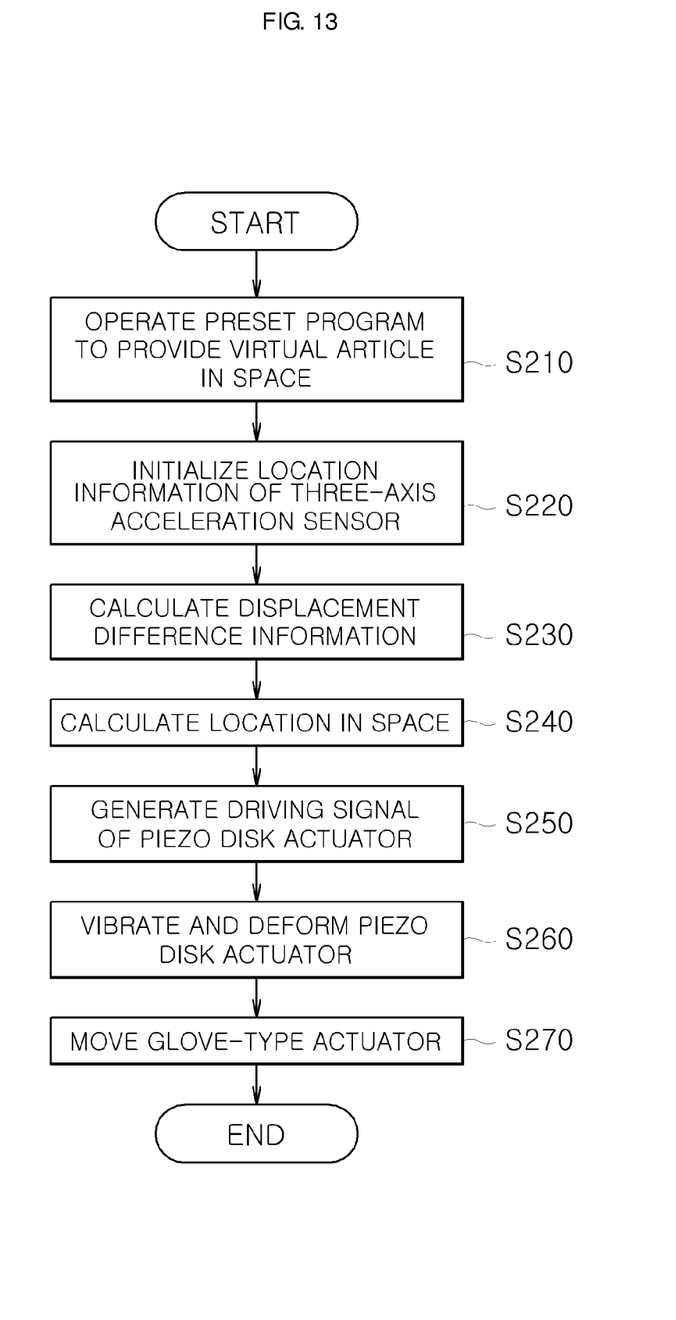
FIG. 13 is a flowchart for illustrating a method for transmitting tactile sensation using a glove-type actuator according to another embodiment of the present disclosure.

FIG. 13 is a flowchart for illustrating a method for transmitting tactile sensation using a glove-type actuator according to another embodiment of the present disclosure.

Referring to FIG. 13, first, a preset program storing minute contour information of the article surface is operated to provide a virtual article in a space (S210). In order to provide the virtual article in the space, hologram or the like may be used.

Subsequently, the location information of the three-axis acceleration sensor 102 attached to the glove-type actuator 100 in the space is initialized (S220). Next, if the glove-type actuator 100 moves in the space in an upper, lower, right and left direction, the three-axis acceleration sensor 102 calculates displacement difference information (S230).

The controller calculates a location of the glove-type actuator 100 in the space based on the calculated displacement difference information (S240). Subsequently, the controller recognizes minute contour information corresponding to the location in the space and generates a driving signal containing information such as the intensity of voltage and/or the magnitude of amplitude in order to operate the piezo disk actuators 124, 134, 144 (S250). The roughness factor of the contour information in the space varies according to the frequency of stimuli. Therefore, if the driving signal is configured as a frequency-type signal, the roughness of the surface may be changed easily, and the device of FIG. 7 may easily change the frictional coefficient.

Next, the driving signal containing the information such as the intensity of voltage and/or the magnitude of amplitude generated by the controller is transferred to the actuator modules 110, 120, 130, 140, 150, and accordingly the piezo disk actuators 124, 134, 144 vibrate and deform to transfer tactile sensation to the user (S260).

Successively, the glove-type actuator 100 moves in the space (S270), and Operations from S230 to S270 repeat.

While the exemplary embodiments have been shown and described, it will be understood by those skilled in the art that various changes in form and details may be made thereto without departing from the spirit and scope of this disclosure as defined by the appended claims.

The invention claimed is:

1. A system transmitting tactile sensation of a surface of a displayed article, the system comprising:
    a touch screen configured to operate a preset program; and
    a glove-type actuator configured to provide a user with contour information of a surface of a programmed article displayed on the touch screen,
    wherein the glove-type actuator includes:
        at least one actuator module having deformable shape which varies in response to an intensity of voltage applied thereto;
        a three-axis acceleration sensor configured to sense a location of the actuator module; and
        a controller configured to map the location having information sensed by the three-axis acceleration sensor with a corresponding location on the touch screen, and generate a driving signal to actuate the actuator module according to contour information of a surface of an article corresponding to the mapped location, and
    wherein the shape of the actuator module is deformed in correspondence with an intensity of voltage generated in association with the contour information of the surface of the article determined for the mapped location.

2. The system according to claim 1, wherein the actuator module includes:
    a lower plate which comes in contact with a surface of the touch screen; and
    a piezo disk actuator connected to the lower plate and causing vibration and deformation according to the driving signal of the controller.

3. The system according to claim 2, wherein the actuator module further includes a frame having a concave shape connected to the lower plate so that the piezo disk actuator is disposed therein.

4. The system according to claim 3, wherein a plurality of piezo disk actuators are arranged in the frame in a lattice pattern.

5. The system according to claim 2, wherein a plurality of pores are formed in a bottom surface of the lower plate.

6. The system according to claim 2, wherein an insulator is attached to a conductor portion of the piezo disk actuator.

7. The system according to claim 1, wherein the controller stores information mapped about the contour information of the surface of the programmed article in a database.

8. A method transmitting tactile sensation using a glove-type actuator, the method comprising:
    operating a preset program at a touch screen;
    storing mapped contour information of a surface of a programmed article displayed on the touch screen in a database;
    allowing an actuator module of the glove-type actuator to come in contact with the touch screen;
    sensing a location of the actuator module on the touch screen, and generating, by a controller of the glove-type actuator, voltage according to contour information of a surface of an article corresponding with the sensed location; and
    deforming the shape of the actuator module in response to an intensity of voltage generated in association with the contour information of the surface of the article determined for the sensed location.

9. The method according to claim 8, wherein the location of the actuator module on the touch screen is sensed by a three-axis acceleration sensor attached to the glove-type actuator.

10. The method according to claim 8, wherein the actuator module includes a piezo disk actuator causing vibration and deformation by converting an electric driving signal generated by the controller into a physical signal.

11. A method transmitting tactile sensation using a glove-type actuator, the method comprising:
    operating a preset program storing contour information of a surface of an article to provide a virtual object in a space;
    sensing, by a three-axis acceleration sensor, movement of the glove-type actuator in the space, and calculating a location by using displacement difference information in the space;
    mapping the calculated location with a corresponding location of the virtual object;
    generating, by a controller of the glove-type actuator, voltage according to contour information of a surface of an article corresponding to the mapped location; and
    deforming the shape of the actuator module in response to an intensity of voltage generated in association with the contour information of the surface of the article determined for the mapped location.

12. The method according to claim 11, further comprising storing mapping of the contour information of the surface of the article in the controller in a database in advance.

13. The method according to claim 11, wherein the driving signal is a frequency-type signal.

14. The method according to claim 11, wherein the shape of the actuator module is changed by adjusting the intensity of the voltage according to the contour information of the surface of the article.

* * * * *